US005719210A

United States Patent [19]

Arora et al.

[11] Patent Number: 5,719,210
[45] Date of Patent: Feb. 17, 1998

[54] SELF-DISPERSING CURABLE EPOXY RESINS, DISPERSIONS MADE THEREWITH, AND COATING COMPOSITIONS MADE THEREFROM

[75] Inventors: Kartar S. Arora, Chalfont; Shailesh Shah, Dresher, both of Pa.

[73] Assignee: Henkel Corporation, Plymouth Meeting, Pa.

[21] Appl. No.: 757,030

[22] Filed: Nov. 26, 1996

[51] Int. Cl.$^6$ .......................... C08G 59/04; C08L 63/00
[52] U.S. Cl. .......................... 523/404; 523/403; 528/103; 528/110; 525/507; 525/524
[58] Field of Search .......................... 523/404, 403; 528/110, 103; 525/507, 524

[56] References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zora et al. | 260/29.2 |
| 3,366,600 | 1/1968 | Haberliin et al. | 260/47 |
| 3,515,698 | 6/1970 | Mauz et al. | 260/75 |
| 3,538,184 | 11/1970 | Heer | 260/830 |
| 3,547,881 | 12/1970 | Mueller et al. | 260/47 |
| 3,634,348 | 1/1972 | Carter et al. | 260/18 |
| 3,639,344 | 2/1972 | Kjnneman et al. | 260/47 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |
| 4,105,634 | 8/1978 | Hanson et al. | 526/65 |
| 4,113,684 | 9/1978 | Petrie | 260/29.2 |
| 4,116,900 | 9/1978 | Belanger | 260/18 |
| 4,134,864 | 1/1979 | Belanger | 260/18 |
| 4,137,140 | 1/1979 | Belanger | 204/18 |
| 4,139,510 | 2/1979 | Anderson | 260/18 |
| 4,177,177 | 12/1979 | Vanderhoff et al. | 260/29.2 |
| 4,182,831 | 1/1980 | Hicks | 528/103 |
| 4,197,389 | 4/1980 | Becker | 528/103 |
| 4,246,148 | 1/1981 | Shimp et al. | 260/18 |
| 4,315,044 | 2/1982 | Elmore et al. | 427/386 |
| 4,415,682 | 11/1983 | Becker | 523/403 |
| 4,420,574 | 12/1983 | Moriarity et al. | 523/404 |
| 4,420,606 | 12/1983 | Waddill | 528/111 |
| 4,421,906 | 12/1983 | Waddill et al. | 528/111 |
| 4,423,166 | 12/1983 | Moriarity et al. | 523/414 |
| 4,423,170 | 12/1983 | Waddill | 523/417 |
| 4,430,261 | 2/1984 | Schäfer et al. | 260/404.8 |
| 4,533,254 | 8/1985 | Cook et al. | 366/176 |
| 4,605,044 | 8/1986 | Sakano | 139/304 |
| 4,608,405 | 8/1986 | DeGooyer | 523/404 |
| 4,608,406 | 8/1986 | Williams et al. | 523/424 |
| 4,678,712 | 7/1987 | Elliott | 428/418 |
| 4,728,384 | 3/1988 | Goel | 156/307.3 |
| 4,738,995 | 4/1988 | Kooijmans et al. | 523/404 |
| 4,769,438 | 9/1988 | Zimmerman et al. | 528/104 |
| 4,810,535 | 3/1989 | McCollum et al. | 427/410 |
| 4,824,927 | 4/1989 | Dobbelstein et al. | 528/88 |
| 4,835,225 | 5/1989 | Massingll, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijmans et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Treybig et al. | 523/404 |
| 5,059,293 | 10/1991 | Sugishima et al. | 204/181 |
| 5,118,729 | 6/1992 | Piechocki | 523/404 |
| 5,221,700 | 6/1993 | Gilbert et al. | 523/404 |
| 5,246,984 | 9/1993 | Darwen et al. | 523/404 |
| 5,262,465 | 11/1993 | Ott et al. | 523/415 |
| 5,565,505 | 10/1996 | Papalos et al. | 523/404 |
| 5,565,506 | 10/1996 | Papalos et al. | 523/404 |
| 5,583,167 | 12/1996 | Chou et al. | 523/404 |

FOREIGN PATENT DOCUMENTS 2127829  9/1983  United Kingdom .

OTHER PUBLICATIONS

"Water–Reducible Coatings via Epoxy Resin Modification with Jeffamine (Reg. TM) Ed–2001 and Jeffamine (Reg TM) M–1000".
Technical literature of Synthron Inc., Morgantown, North Carolina.
"Jeffamine® Polyoxypropyleneamine Curing Agents for Epoxy Resins", Texaco Chemical Company.
"Advanced Amine Technology for Superior Polymers", Texaco Chemical Company, 1992.
H. Lee and K. Neville, "Epoxy Polymers," *Encyclopedia of Polymer Science and Technology*, vol. 6, pp. 209–271, John Wiley and Sons, Inc., 1967.
*Encyclopedia of Polymer Science and Engineering*, John Wiley and Sons, New York, NY, vol. 6, pp. 340–361.
W.C. Griffith, "Emulsions", *Encyclopedia of Chemical Technology*, vol. 8, pp. 900–930, John Wiley and Sons, New York, NY, 1979.
Wicks, Z.W., Jr., Jones, F.N., Pappas, S.P., *Organic Coatings: Science and Technology, vol. II, Application Properties and Performance*, John Wiley & Sons, Inc., NY, 1994, pp. 42–45.
E. Hafslund, "Distillation", *Encyclopedia of Chemical Technology*, vol. 7, pp. 849–891, John Wiley and Sons, New York, NY, 1979.
F. Standiford, "Evaporation", *Encyclopedia of Chemical Technology*, vol. 9, pp. 472–493, John Wiley and Sons, New York, NY, 1980.

*Primary Examiner*—Frederick Krass
*Attorney, Agent, or Firm*—Wayne C. Jaeschke; John Daniel Wood; John E. Drach

[57] ABSTRACT

A method of preparing a self-dispersing epoxy resin composition is provided. The method comprises reacting a polyepoxide with a polyoxyalkylene polyol wherein the equivalent ratio of epoxide groups of said polyepoxide to hydroxyl groups of said polyoxyalkylene polyol is greater than 10:1, to form an polyol-epoxy adduct and reacting said polyol-epoxy adduct with a polyepoxide and a polyhydric alcohol to form a self-dispersing epoxy resin. Also provided are aqueous dispersions of the self-dispersing epoxy resin and coating compositions comprising the same. The coating compositions are particularly useful as industrial maintenance coatings.

32 Claims, No Drawings

5,719,210

SELF-DISPERSING CURABLE EPOXY RESINS, DISPERSIONS MADE THEREWITH, AND COATING COMPOSITIONS MADE THEREFROM

FIELD OF THE INVENTION

The present invention relates to coating compositions made from aqueous epoxy dispersions. More specifically, this invention relates to self-dispersing curable epoxy resins, and to aqueous dispersions and coating compositions comprising the same.

BACKGROUND OF THE INVENTION

Epoxy resins have long been in widespread use as components in coating compositions. Coatings which comprise cured epoxy resins are valued for their durability, chemical resistance, and excellent adhesion to a broad range of substrates. Particularly desirable from an environmental point of view are epoxy resins which may be applied to a substrate with either minimal or no release of volatile organic components. Toward this end, there has been much research directed to the development of aqueous dispersions and emulsions of epoxy resins.

SUMMARY OF THE INVENTION

This invention relates to a method of preparing a self-dispersing epoxy resin composition comprising reacting a polyepoxide with a polyoxyalkylene polyol wherein the equivalent ratio of epoxide groups of said polyepoxide to hydroxyl groups of said polyoxyalkylene polyol is greater than 10:1, to form an polyol-epoxy adduct and reacting said polyol-epoxy adduct with a polyepoxide and a polyhydric phenol to form a self-dispersing epoxy resin.

The self-dispersing epoxy resin of the invention forms an aqueous dispersion upon mixing with water. When cured, films of the self-dispersing curable epoxy resin are useful as a coating composition.

DETAILED DESCRIPTION OF THE INVENTION

The self-dispersing curable epoxy resin formulation of the invention is prepared by first reacting a polyepoxide with a polyoxyalkylene polyol. The ratio of epoxide groups of said polyepoxide to hydroxyl groups of said polyoxyalkylene polyol is greater than 10:1, typically from about 11:1 to about 50:1, more typically from about 15:1 to about 25:1. The reaction should be conducted under conditions which promote substantial completion of the reaction as evidenced by consumption of the polyoxyalkylene polyol, but which typically is incomplete with respect to the consumption of the polyepoxide. Typically, at the termination of the reaction, at least about 150% of the equivalents of epoxy groups based on the equivalents of the hydroxyl groups initially present in the polyoxyalkylene polyol will have reacted and more typically from about 175% to about 250%.

The Polyoxyalkylene Polyol

The polyoxyalkylene polyol reactant comprises one or more polyol compounds where the polyol compound comprises both at least 2 hydroxyl groups per molecule and a substantially water-soluble polyether chain. The polyol will typically be a mixture of compounds and should have an average hydroxyl functionality between about 1.5 and about 2.5, more typically about 1.8 to about 2.2. The polyol will typically have a molecular weight of from about 200 to about 20,000, more typically from about 1,000 to about 20,000. The polyoxyalkylene polyol reactant is soluble or at least partially soluble in water.

Illustrative of the polyoxyalkylene polyols employed in the invention are the Pluronic® brand of block copolymers of propylene oxide and ethylene oxide available from BASF Corporation. In these preferred copolymers, the molecular weight (e.g. weight average) ranges from about 4,000 to about 15,000 and the percentage by weight of the copolymer derived from ethylene oxide ranges from about 60% to about 90%, more typically from about 65% to about 85%. These copolymers are described in the *Encyclopedia of Polymer Science and Engineering*, vol. 6, pp. 254–259 (John Wiley & Sons, Inc., N.Y., N.Y., 1986) and in the technical brochure "Pluronic and Tetronic Surfactants", BASF Corporation, Parsippany, N.J., 1989, the disclosure of which is incorporated by reference. The most preferred polyoxyalkylene polyols are block copolymers of propylene oxide and ethylene oxide having from about 75% to about 85% polyoxyethylene and a molecular weight of about 10,000 to about 13,000, e.g. Pluronic® F88 which has a molecular weight of about 11,400 and is about 80% polyoxyethylene and 20% by weight polyoxypropylene. Techniques to prepare suitable polyoxyalkylene polyol reactants are known in the art, and include reacting a hydroxyl group containing initiator, e.g. water, or a diol, e.g. propylene glycol, with propylene oxide, followed by reaction of the polyoxypropylene glycol with ethylene oxide.

The Polyepoxide

The polyepoxide reactant comprises one or more compounds each having a plurality of epoxide functional groups. The polyepoxide reactant has an average of about 2 epoxide groups present in the molecule, e.g. an average epoxy functionality of from about 1.5 to about 2.5, more typically from about 1.8 to about 2.2. Techniques to prepare suitable polyepoxide compounds are known in the art, and include reacting compounds having a plurality of hydroxyl groups with epichlorohydrin in the presence of a suitable catalyst. Preferred polyepoxides are comprised of one or more polyglycidyl ethers of polyhydric phenols having two (2) or more epoxide groups and one (1) or more six-carbon aromatized rings present in the molecule. Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. TM) epoxy resins from Shell Chemical Company, Houston, Tex., and DER (Reg. TM) or DEN (Reg. TM) epoxy resins from Dow Chemical Company, Midland, Mich., and Araldite (Reg. TM) epoxy resins available from Ciba, Hawthorne, N.Y.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$–$C_{18}$ (preferably $C_1$–$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), or novolacs formed by reacting formaldehyde with a phenol, For reasons of cost and availability, the most preferred epoxy resins are polyglycidyl ethers based on bisphenol A.

Preferred epoxy resins are liquids at room temperature and typically have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182–192 grams/equivalent or EPON 828 available from Shell Chemical Company at about 185–192 grams/equivalent.

The Polyhydric Phenol

The polyhydric phenol reactant comprises one or more compounds each having a plurality of hydroxyl groups covalently bonded to one or more six-carbon aromatized rings. The polyhydric phenol reactant may contain substituents such as alkyl, aryl, sulfido, sulfonyl, halo, and the like. The polyhydric phenol is represented by the structural formula:

$$R_9(OH)_h$$

wherein $R_9$ represents an 'h' valent $C_6$–$C_{50}$ organic radical comprising at least one six-carbon aromatized ring, and 'h' represents a number of phenolic hydroxyl groups where 'h' is equal to or greater than 2 but less than or equal to 6.

Techniques to prepare suitable polyhydric phenol compounds are known in the art. Suitable polyhydric phenol compounds are commercially available from Dow Chemical Company, Midland, Mich., and Shell Chemical Company, Houston, Tex.

Illustrative of suitable polyhydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, phenol-formaldehyde novolac resins, and the like. The most preferred dihydric phenols are 2,2-bis(4-hydroxyphenyl)propane (bisphenol A) and bis(4-hydroxyphenyl)methane (bisphenol F) for reasons of cost and availability.

In certain embodiments, an alkyl-phenol-formaldehyde novolac resin is also used in a small amount, e.g. from about 0.015 to about 0.060 moles, more typically from about 0.025 moles to about 0.040 moles, per mole of epoxy resin, in addition to the preferred dihydric phenol, bisphenol A. Alkyl-phenol-formaldehyde novolac resins are made from alkyl phenols and formaldehyde wherein the alkyl group contains 4 to 12 carbon atoms. Such alkyl phenols include tertiary-butyl phenol, hexyl phenol, octyl phenol, nonyl phenol and dodecyl phenol. A preferred alkyl phenol is nonyl phenol. Novolac resins are made by reacting the phenol with formaldehyde under acid conditions. In novolac resins the phenol moieties are linked together through methylene bridges. Novolac resins contain no reactive methylol groups. Novolac resins useful in this invention have molecular weights within the range of about 1000 to about 5000 and melting points of about 50° to about 200° C.

The Polyol-Epoxy Adduct

The preparation of the self-dispersing curable epoxy resins of the invention proceed through a polyol-epoxy adduct, where the polyol-epoxy adduct is subsequently reacted with a polyhydric phenol and an epoxy resin. Preferably, the polyol-epoxy adduct is prepared by condensation of the polyoxyalkylene polyols mentioned with the polyepoxy compound in the presence of suitable catalysts, typically at 50° to 250° C., preferably at 90° to 200° C., the equivalent ratio of the epoxy groups to the OH groups being greater than 10:1, preferably greater than 15:1, e.g. from about 20:1 to about 50: 1. By polyol-epoxy adduct is meant the mixture that results from the condensation reaction.

Suitable catalysts for preparing the dispersing agent are strong inorganic and organic bases, such as, for example, sodium hydroxide, potassium hydroxide, lithium hydroxide, barium hydroxide, strontium hydroxide, alkali metal alcholates, such as sodium methoxide, lithium methoxide, sodium ethoxide and potassium dodecyloxide, and the alkali metal salts of carboxylic acids, such as, for example, sodium stearate and lithium stearate. Strong inorganic and organic protic acids, for example phosphoric acid, tetrafluoroboric acid and benzenesulfonic acid, are also suitable. Furthermore, the catalysts used can be Lewis acids. Examples include tin(IV) chloride, titanium(IV) chloride, titanium(IV) isopropoxide, triethyloxonium tetrafluoroborate and boron trifluoride and its complexes, for example with phosphoric acid, acetic acid 1:1 and 1:2), methanol, diethyl ether, tetrahydrofuran, phenol, ethylene glycol monoethyl ether, polyethylene glycol (MW200), dimethyl sulfoxide, di-n-butyl ether, di-n-hexyl ether, succinic acid, and aliphatic, cycloaliphatic, araliphatic amines and nitrogen heterocycles.

Catalysts which are preferably used are boron trifluoride-diethyl ether, boron trifluoride-amine complexes and aqueous tetrafluoroboric acid. The amount of catalyst is in general 0.1 to 5, preferably 0.1 to 1% by weight, relative to the reaction mixture. For improved metering, the catalyst can be diluted in a solvent, such as diethyl ether, a glycol ether or cyclic ether, ketones, and the like.

To prepare the polyol-epoxy adduct, the mixtures of hydroxyl- and epoxy-containing compounds to be reacted are heated to the temperature at which condensation proceeds at a sufficient rate, e.g., within about 30 minutes to about 5 hours. Advantageously, the reaction is monitored by the increase of the epoxy equivalent, which indicates a decrease in the epoxy group content. The reaction can be stopped by cooling below the reaction temperature.

The structure of the polyol-epoxy adduct is dependant on the structures of the polyoxyalkylene polyol and the polyepoxide used in the preparation of the polyol-epoxy adduct, as well as the relative ratio of the reactants. Without wishing to be bound by any theory, unless expressly noted otherwise, it is believed that each of the hydroxyl groups of the polyoxyalkylene polyol reacts with an epoxy group of the polyepoxide. This reaction creates an intermediate that has a hydroxyl functionality as a result of the opening of the oxirane ring of the epoxy group of the polyepoxide that reacted with the hydroxyl group of the polyoxyalkylene polyol. Because the polyepoxide has additional epoxy functionality, the intermediate will also have at least one residual epoxy functionality for each of the hydroxyl groups of the polyol. The hydroxyl groups of the intermediate can then react with the oxirane ring of an additional polyepoxide and will most probably do so because of the high ratio of polyepoxide to polyoxyalkylene polyol. This resulting intermediate will also have a new hydroxyl group because of the opening of the oxirane ring of the additional molecule of polyepoxide which can, in turn, react with an additional molecule of polyepoxide. Again, because the polyepoxide has additional epoxy functionality that is unreacted, the intermediate will also have an increased epoxy functionality. The net effect of the sequential reaction of the hydroxyl groups formed by opening of the oxirane ring of the each additional polyepoxide molecule is to produce an adduct that has multiple epoxy functionality.

For example, if a polyoxyalkylene diol molecule reacts with two diepoxide molecules, then the resulting first intermediate will be a diepoxide that is also a diol. If each of the hydroxyl groups of this first intermediate react with another molecule of diepoxide, the resulting second intermediate will be a diol which also has four epoxide groups. If each of the hydroxyl groups of this second intermediate diol reacts with a diepoxide molecule, the resulting product will be a diol with six epoxide groups. Thus, it is believed that the polyol-epoxy adduct of this invention will have a high epoxy functionality, typically the average epoxy functionality of the adduct will be greater than about 2.5, more typically greater than about 3.0, e.g. from about 3.5 to 4.5.

The Self-Dispersing Curable Epoxy Resin

The self-dispersing curable epoxy resins of the invention may be prepared by reacting a polyol-epoxy adduct with a polyhydric phenol and an epoxy resin, which epoxy resin may be the same or different from the polyepoxide used to form the polyol-epoxy adduct. In general, however, the foregoing description of polyepoxides is descriptive of the epoxy resins which are useful herein for preparing the self-dispersing epoxy resin. The relative proportions of the reactants may vary broadly, but the epoxy resin is used in a stoichiometric excess to the polyhydric phenol. Typically, for each equivalent of epoxy resin, there will be from about 0.01 to 1.0 reactive equivalents, preferably from about 0.4 to 0.6 reactive equivalents of a polyhydric phenol. The amount of polyol-epoxy adduct in the self-dispersing epoxy resin will be preferably from about 1 to 25, typically from about 1.5 to 20 and more typically from about 2 to 15 weight percent of the self-dispersible resin. The self-dispersing epoxy resin is typically prepared by combining the polyol-epoxy adduct, the polyhydric phenol and the epoxy resin, and heating the mixture in the presence of a catalyst, e.g., potassium hydroxide, triphenyl phosphine, benzyl dimethylamine, ethyl triphenylphosphonium iodide and the like, to a temperature of about 100° to 200° C., e.g. 160° C., with stirring. An exothermic reaction will then occur, and cooling is applied to maintain the reaction temperature at about 150°–160° C. The mixture is maintained at about 160° C. until the desired epoxy equivalent weight is obtained, e.g. from about 500 to about 700 g/eq., typically for about one hour and then cooled to about 120° C., whereupon a small amount of a water-soluble organic solvent is added prior to cooling and discharging the self-dispersing curable epoxy resin from the reactor.

In certain embodiments, the epoxy resin will be further comprised of a minor amount, on both a weight and equivalents basis as a percentage of the epoxy resin, of an epoxy novolac resin. The amount of the epoxy novolac resin will typically be from about 0.015 to about 0.060 mole per mole of the polyepoxide, more typically from about 0.025 to about 0.040 mole per mole of the polyepoxide. An example of such an epoxy novolac resins are DEN 438 and 438 from Dow Chemical, which are a phenol-formaldehyde epoxy novolac with a nominal epoxy functionality of about 3.6 and 3.8, respectively.

Organic Cosolvents

The self-dispersing curable epoxy resin of the present invention may be combined with a non-reactive, water-miscible, organic cosolvent. The cosolvent serves to reduce the viscosity of the self-dispersing curable epoxy resin. Preferred organic cosolvents include the alkyl ethers of monohydric and dihydric alcohols, where the alkyl group comprises $C_1$–$C_8$ linear or branched aliphatic or alicyclic chains. The choice of cosolvent can affect the pot-life of the self-dispersing curable epoxy resin. For example, for a given resin it may be possible to increase the pot-life by substituting for a cosolvent such as Ektasolve EP (Eastman Chemicals) with one of the following cosolvents (the greater increase being obtained in order): 1-methoxy-2-propyl acetate, methyl n-amyl ketone, or dipropylene glycol n-butyl ether. Other useful cosolvents include the monoethyl ether of propylene glycol and the monopropyl ether of propylene glycol.

Reactive Diluents

The preferred stable aqueous epoxy resin dispersions of the present invention are those which contain a monoepoxide reactive diluent, e.g. a water-immiscible $C_8$–$C_{20}$ aliphatic monoepoxide. The monoepoxide component can contain alicyclic and aromatic structures, as well as halogen, sulfur, phosphorus, and other such heteroatoms. Suitable reactive diluents are available from CVC Specialty Chemicals, Inc., Cherry Hill, N.J.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_8$–$C_{10}$ aliphatic alcohols.

The presence of a monoepoxide reactive diluent in an aqueous epoxy resin dispersion has significant beneficial effects in addition to modifying the viscosity of the dispersion. For example, the said water-immiscible reactive diluent appears to coat the particles of epoxy resin solids and thereby provide the aqueous dispersion with improved shear, freeze-thaw resistance, shelf viscosity stability, and paint gloss. Further, the amount of the mono-epoxide diluent in said aqueous dispersion may be sufficient to increase the pot-life of a coating composition prepared from said aqueous dispersion. Typically, the monoepoxide reactive diluent will be present in an amount of about 0.1% to about 10%, more typically about 0.5% to about 7.5%, and most typically from about 1.0% to about 3.0% by weight of self-dispersing resin.

Also, since the reactive diluent is epoxy functional, it becomes chemically bonded into the film which is formed during the subsequent room temperature curing of the aqueous dispersion composition after it has been blended with a curing agent and coated on a surface. The total quantity of reactive diluent contributes to the calculated proportion of non-volatiles in the dispersion composition.

Alternatively to the monoepoxide reactive diluent, or in addition thereto, a multi-functional-epoxide can be present in the aqueous dispersion, e.g. an epoxide having an epoxy functionality of greater than about 2.5, more typically greater than about 3.0. The amount of the multi-functional-expoxide will typically range from about 1% to about 10%, more typically from about 2% to about 8%, by weight of the self-dispersing resin. Examples of such multi-functional-epoxides are the epoxy novolac resins, e.g. DEN 438 and 439 from Dow Chemical, which are a phenol-formaldehyde epoxy novolac with a nominal epoxy functionality of about 3.6 and 3.8, respectively.

Preparation of an Aqueous Dispersion of the Self-Dispersing Curable Epoxy Resin The aqueous epoxy dispersion of the invention is prepared by charging the self-dispersing curable epoxy resin to a reaction vessel, then heating the resin to about 50°–100° C. with stirring. Water is gradually added to the self-dispersing curable epoxy resin while the temperature is allowed to drop to about 50° C. During this period, the water in oil dispersion is formed and then inverts to an oil in water dispersion. After inversion, additional water may be added as well as reactive diluent in the form of a $C_8$–$C_{10}$ alcohol mono-glycidyl ether.

The particle size of the oil phase in the aqueous dispersion can be modified by physical techniques to reduce the particle size. The particle size reduction is preferably accomplished by subjecting an aqueous dispersion of the precipitate to high shear, e.g. in a homogenizer such as that disclosed in U.S. Pat. No. 4,533,254 (Cook et al.), the disclosure of which is incorporated herein by reference, and commercially available as MICROFLUIDIZER™ from Microfluidics Corporation, Newton, Mass. Homogenizers are discussed in W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosure of which is incorporated herein by reference.

The aqueous dispersion of self-dispersing resin will typically exhibit excellent chemical and physical stability over an extended shelf-life, e.g. of from five to six months. As an example of the chemical stability, the epoxide equivalent weight (EEW) of the aqueous dispersion of self-dispersing resin should remain essentially constant, e.g. should show no trend of increasing molecular weight, over a period of at least one month from the preparation of the aqueous dispersion. Epoxide equivalent weight can be determined by differential titration with perchloric acid using crystal violet as an indicator.

As an example of physical stability, the resin should not display layer formation for a period of at least one month from the preparation of the aqueous dispersion, i.e. there should be no formation of a macro-observable water phase as a layer separate from the dispersed resin phase.

Coating Compositions Comprising an Aqueous Dispersion of the Self-Dispersing Curable Epoxy Resin The coating composition of the invention is prepared by combining the aqueous epoxy dispersion with a suitable hardening agent. The coatings are tack free after 45 minutes and have excellent film properties. An aqueous epoxy resin paint composition of the present invention may further contain additives conventionally employed in coating technology, such as organic pigments, inorganic pigments, surfactants, thickeners, and the like.

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of from 0.5:1 to 2:1 and, preferably, is in the range between about 0.8:1 to 1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula:

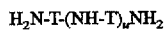

wherein 'T' is an alkylene radical containing 2 to 6 carbon atoms and 'u' is equal to or greater than zero (0) but less than or equal to five (5). Such alkylene polyamines include ethylene diamine, diethylene triamine, triethylene tetramine, tetraethylene pentamine, pentaethylene hexamine, propylene diamine, dibutylene triamine, hexamethylene diamine, and the like.

Other polyamine curing agents that can be employed in the practice of this invention are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116,900, which patents are hereby incorporated by reference.

Examples of useful curing agents also include those disclosed in U.S. patent application Ser. No. 08/085,861, filed Jun. 30, 1993, and now U.S. Pat. No. 5,583,167 entitled "Curing Agents for Aqueous Epoxy Resins", by Jason Chou et al., the disclosure of which is incorporated herein by reference. These epoxy curing agents comprise the reaction product of reactants consisting essentially of an alkylene polyamine having less than about 12 carbon atoms, an aromatic mono-glycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic mono-glycidyl ether to epoxide equivalents of said diglycidyl ether of an aromatic diol is greater than one.

In addition to the amine curing agent, a curing accelerator can be included in the coating composition. Such an accelerator will serve to reduce the time for the coating to become tack-free. Useful accelerators for amine curing agents include tertiary amines, e.g. N,N'-bis(dimethyl-aminopropyl) urea.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, reelamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric ureaformaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group. Other epoxy resin curing agents may also be useful, e.g. catalytic curing agents: Lewis bases (such as tertiary amines), Lewis acids (such as boron trifluoride), cationic curing agents (such as aryldiazonium salts, diaryliodinium salts, onium salts of Group VIa elements, especially sulfur) and reactive curing agents: mercaptans, isocyanates, carboxylic acids, and acid anhydrides. Curing agents for epoxy resins in general are discussed in the *Encyclopedia of Polymer Science and Engineering*, vol. 6, pp. 340–361 (John Wiley & Sons, Inc., N.Y., N.Y., 1986), the disclosure of which is incorporated by reference.

The following examples are further illustrative of the present invention. The reactants and other specific ingredients are presented as being typical, and various modifications can be derived in view of the foregoing disclosure within the scope of the invention.

EXAMPLES

Examples 1–4

Preparation of Epoxy-Polyol Adducts

A suitable laboratory apparatus consists of a reaction kettle, an electrical stirrer, a condenser, means for application of vacuum and inert atmosphere, heating mantle and means to control temperature. A general procedure used for the preparation of epoxy-polyols consisted of addition of polyoxyalkylene glycol (polyol) and the diglycidyl ether of bis-phenol A (liquid epoxy resin, LER) to the reaction kettle. The mixture was heated with stirring to 100° C. under a nitrogen atmosphere. When reaction temperature reached 100° C., flow of nitrogen was discontinued and vacuum to 100–500 mbar was applied. The reaction vessel was held under vacuum for 10–15 minutes and then nitrogen atmosphere was reapplied. Catalyst was added and the reaction mixture heated to 180° C. The reaction mixture was held at 180° C. until the required epoxy equivalent weight (EEW) was attained as determined by titration of the reaction mixture with 0.1N perchloric acid in methylene chloride-glacial acetic acid solvent mixture using crystal violet indicator (ASTM D-1652-88). Composition and key characteristics of the four epoxy-polyols made according to this general procedure are given in Table 1.

TABLE 1

| | Epoxy-Polyol Adducts | | | | |
|---|---|---|---|---|---|
| | Composition, weight % | | | LER:Polyol | |
| Example | Polyol[1] | LER | Catalyst[2] | mole ratio | EEW |
| 1 | 59.41 | 40.19[3] | 0.40 | 20:1 | 576 |
| 2 | 59.39 | 40.17[4] | 0.44 | 20:1 | 570 |
| 3 | 59.12 | 39.99[4] | 0.89 | 20:1 | 1017 |
| 4 | 45.71 | 53.89[4] | 0.40 | 35:1 | 443 |

[1]Pluronic F88 (BASF Performance Chemicals, Parsippany, NJ).
[2]Anchor 1040 (Air Products & Chemicals, Allentown, PA).
[3]D.E.R. 331 (Dow Chemical Company, Midland, MI).
[4]EPON 828 (Shell Chemical Company, Houston, TX).

Examples 5–11

Preparation of Self-dispersible Epoxy Resins

A suitable laboratory apparatus for the preparation of epoxy resins consists of a reaction kettle, an electrical stirrer, a condenser, means for application of inert atmosphere, heating mantle and means to control temperature, and fluid metering pumps. A general procedure used for the preparation of self-dispersing resin was by melting the epoxy-polyol (as is from Example 1–4) by heating in an oven kept at 80±20° C. and then charge to the reactor. A liquid epoxy resin (D.E.R. 331 available from Dow Chemical Company, Midland, Mich. or EPON 828 available from Shell Chemical Company, Houston, Tex.), bis-phenol A (BPA-157 available from Shell Chemical Company), optionally a novolac resin and ethyl triphenylphosphonium iodide (Johnson Mathey, Ward Hill, Mass.) were added and the reaction mixture was heated with stirring to 160° C. under an atmosphere of nitrogen. Cooling was applied if necessary to control the exotherm and maintain the temperature at 160±10 C. After one hour of reaction, the reaction mixture was analyzed for epoxy content by titration with perchloric acid (per ASTM D-1652-88). After completion of reaction as judged by determination of epoxy content the reaction mixture was cooled to 120° C. and 2-propoxyethanol was added over 30–45 minutes with a fluid metering pump. The reaction mixture was then cooled to 95° C. and the first portion of deionized water was added over 20–30 minutes with a fluid metering pump. This gave a water-in-oil dispersion which was cooled with good agitation to 45°–60° C. so that the water-in-oil dispersion inverted to an oil-in-water dispersion. A reactive diluent such as ERISYS GE-7 (CVC Specialty Chemicals, Cherry Hill, N.J.) was added followed by addition of the second portion of water. The dispersion of epoxy resin obtained in this manner was heated to 60°–75° C., mixed to attain a homogeneous dispersion, cooled to 35°–45° C. and discharged. Composition of the dispersions made according to this same or a similar general procedure are given in Table 2. Characteristics of dispersions were obtained as described below and are reported in Table 3. Particle size was determined by a Microtrac II model 7997-10 & 20, mean value given in Table 3. Viscosity determined by a Brookfield model DVII+viscometer. Solids were determined by heating about one gram of the sample in oven maintained at 150° C. for one hour. Molecular weight was determined by Size Exclusion Chromatography using Phenogel columns calibrated with narrow molecular weight distribution standards.

TABLE 2

Composition of Epoxy Resins

| Example | Epoxy | BPA | Dispersant | Modifier | GE-7 | Solvent | Water |
|---|---|---|---|---|---|---|---|
| 5 | 35.6[1] | 12.5 | 5.5[2] | — | 1.1 | 8 | 37.3 |
| 6 | 35.1[3] | 10.1 | 4.1[4] | 3.2[5] | 1.1 | 8 | 38.4 |
| 7 | 32.3[3] | 12.5 | 5.1[4] | 3.2[6] | 1.1 | 10 | 35.8 |
| 8 | 35.3[3] | 12.4 | 5.4[4] | — | 1.1 | 10 | 35.8 |
| 9 | 32.2[3] | 12.5 | 5.1[4] | 3.3[7] | 1.1 | 10 | 35.8 |
| 10 | 35.6[3] | 12.1 | 5.4[8] | — | 1.1 | 10 | 35.8 |
| 11 | 33.9[3] | 12.2 | 7.1[9] | — | 1.1 | 10 | 35.8 |

Composition, weight %

[1] With D.E.R. 331 (Dow Chemical Co., Midland, MI).
[2] Example 1, Table 1.
[3] With EPON828 (Shell Chemical Company, Houston, TX).
[4] Example 2, Table 1.
[5] With SP 1090 (nonylphenol novolac resin, Schenectady Chemicals, Inc., Schenectady, NY) added prior to molecular weight advancement.
[6] With DEN438 (polyfunctional epoxy novolac resin, Dow Chemical Co., Midland, MI) added after molecular weight advancement.
[7] With DEN438 added prior to molecular weight advancement.
[8] Example 3, Table 1.
[9] Example 4, Table 1.

TABLE 3

Characteristics and Analysis of Epoxy Resins

| Sample ID | EEW | Particle Size | Viscosity | Solids | MW | MN | PDI |
|---|---|---|---|---|---|---|---|
| Example 5 | 620 | 1.6 | 6,670 | 54.6 | 2940 | 1,580 | 1.85 |
| Example 6 | 580 | 1.2 | 38,000 | 52.6 | 6,370 | 1,710 | 3.73 |
| Example 7 | 580[1] | 1.3 | 18,360 | 53.9 | 4,680 | 1,530 | 3.05 |
| Example 8 | 620 | 1.1 | 2,050 | 53.5 | 4,290 | 1,460 | 2.94 |
| Example 9 | 610 | 0.8 | 8,620 | 53.4 | 5,450 | 1,550 | 3.51 |
| Example 10 | 610 | 1.9 | 93,100 | 54.2 | 5,870 | 1,440 | 4.07 |
| Example 11 | 600 | 2.8 | 17,540 | 54.3 | 4,500 | 1,430 | 3.14 |

[1] Determined from dispersion, all others on resin before solvent addition.

Example 12

Coatings Evaluation

A general procedure used for the preparation of coatings was by combining epoxy resin dispersions with EPI-CURE 8290 curing agent (Shell Chemical Co., Houston, Tex.) at 1:1 equivalent ratio and drawing down with wire-wound bar over metal panels. Formula of a red-oxide primer used for this purpose is given in Table 4. Coatings were baked at 82° C. and then evaluated for solvent resistance with methyl ethyl ketone (MEK). Solvent resistance was measured 1 and 24 hours after baking of coatings. Results for coatings made in accordance with the same or a similar general procedure are given in Table 5.

TABLE 4

Red-oxide Primer Formulation

| Ingredient | Amount parts |
|---|---|
| Part A | |
| Epoxy resin dispersion | 38.55 |
| Ethylene glycol propyl ether | 0.86 |
| Red iron oxide | 8.64 |
| Wollastocoat 10ES | 18.83 |
| Halox SZP391 | 4.32 |
| Water, de-ionized | 10.88 |
| Part B | |
| Curing agent | 8.96 |
| Water, de-ionized | 8.96 |
| Total | 100.00 |

Formula based on epoxy resin of epoxy equivalent weight 625 (based on solids) and 53.5% solids content. Curing agent used was Epi-Cure (Reg TM) 8290-Y-60 available from Shell Chemical Company.

TABLE 5

Solvent Resistance of Coatings

| | MEK double rubs | | | |
|---|---|---|---|---|
| Epoxy Resin | 15 min bake @ 1 h | 30 min bake @ 1 h | 15 min bake @ 24 h | 30 min bake @ 24 h |
| EPI-REZ 5522[1] | 118 | 205 | 188 | 410 |
| Example 6 | 112 | 247 | 149 | 441 |
| Example 5 | 135 | 239 | 154 | 305 |

[1] An epoxy resin dispersion available from Shell Chemical Company, Houston, TX, believed to be based on the teachings of U.S. Pat. 4,605,044.

Example 13

Evaluation of Coatings

A general procedure used for the preparation of coatings was by combining epoxy resin dispersions with EPI-CURE 8290 curing agent (Shell Chemical Co., Houston, Tex.) at 1:1 equivalent ratio and drawing down with wire-wound bar over metal panels. Coatings were baked at 82° C. and then evaluated for solvent resistance with methyl ethyl ketone (MEK). Solvent resistance was measured in duplicate 30 minutes after baking of coatings. Results for coatings made in accordance with the same or a similar general procedure are given in Table 6.

TABLE 6

Solvent Resistance of Coatings

| | MEK double rubs after 30 min | |
|---|---|---|
| Epoxy Resin | Baked for 15 min @ 82° C. | Baked for 30 min @ 82° C. |
| EPI-REZ 5522[1] | 67 | 153 |
| | 88 | 168 |
| Example 5 | 89 | 164 |
| | 101 | 177 |
| Example 7 | 107 | 165 |
| | 107 | 181 |
| Example 8 | 113 | 221 |
| | 130 | 237 |
| Example 9 | 138 | 209 |
| | 160 | 224 |
| Example 10 | 159 | 336 |
| | 170 | 360 |

[1] An epoxy resin dispersion available from Shell Chemical Company, Houston, TX, believed to be based on the teachings of U.S. Pat. 4,605,044.

Example 14

Evaluation of Coatings

A general procedure used for the preparation of coatings was by combining epoxy resin dispersions with EPI-CURE 8290 curing agent (Shell Chemical Co., Houston, Tex.) at 1:1 equivalent ratio and drawing down with wire-wound bar over metal panels. Coatings were baked at 82° C. and then evaluated for solvent resistance with methyl ethyl ketone (MEK). Solvent resistance was measured in duplicate 30 minutes after baking of coatings. Results for coatings made in accordance with the same or a similar general procedure are given in Table 7.

TABLE 7

Solvent Resistance of Coatings

| Epoxy Resin | MEK double rubs after 30 min | |
|---|---|---|
| | Baked for 15 min @ 82° C. | Baked for 30 min @ 82° C. |
| EPI-REZ 5522[1] | 100 | 185 |
| | 110 | 180 |
| Example 5 | 90 | 165 |
| | 95 | 150 |
| Example 11 | 120 | 140 |
| | 130 | 135 |

[1] An epoxy resin dispersion available from Shell Chemical Company, Houston, TX believed to be based on the teachings of U.S. Pat. 4,605,044.

Example 15

Evaluation of Coatings

A general procedure used for the preparation of coatings was by combining epoxy resin dispersions with EPI-CURE 8290 curing agent (Shell Chemical Co., Houston, Tex.) at 1:1 equivalent ratio and drawing down with wire-wound bar over metal panels. Coatings were baked at 82° C. and then evaluated for solvent resistance with methyl ethyl ketone (MEK). Solvent resistance was measured in duplicate 30 minutes after baking of coatings. Results for coatings made in accordance with the same or a similar general procedure are given in Table 8.

TABLE 8

Solvent Resistance of Coatings

| Sample ID | MEK double rubs for coatings baked for 30 min @ 82° C. | |
|---|---|---|
| | After 30 min | After 4 h |
| EPI-REZ 5522[1] | 228 | 300 |
| | 233 | 280 |
| EPI-REZ 3520[2] | 130 | 218 |
| | 156 | 227 |
| Example 5 | 210 | 224 |
| | 215 | 247 |
| Example 11 | 210 | 290 |
| | 223 | 346 |
| Example 2 | 216 | 315 |
| | 190 | 320 |

[1] An epoxy resin dispersion available from Shell Chemical Company, Houston, TX, believed to be based on the teachings of U.S. Pat. 4,605,044.
[2] An epoxy resin dispersion available from Shell Chemical Company, Houston, TX, believed to be based on the teachings of U.S. Pat. 4,315,044.

What is claimed is:

1. A composition comprised of a self-dispersing epoxy resin composition produced by the process comprising reacting a polyepoxide with a polyoxyalkylene polyol wherein the equivalent ratio of epoxide groups of said polyepoxide to hydroxyl groups of said polyoxyalkylene polyol in the reaction mixture is greater than 10:1, to form an polyol-epoxy adduct and reacting said polyol-epoxy adduct with an epoxy resin and a polyhydric phenol to form a self-dispersing epoxy resin.

2. The composition of claim 1 wherein the ratio of epoxide groups of said polyepoxide to hydroxyl groups of said polyoxyalkylene polyol is from about 11:1 to about 50:1.

3. The composition of claim 1 wherein the ratio of epoxide groups of said polyepoxide to hydroxyl groups of said polyoxyalkylene polyol is from about 15:1 to about 25:1.

4. The composition of claim 1 wherein the reaction is conducted under conditions which promote substantial completion of the reaction as evidenced by consumption of the polyoxyalkylene polyol, said reaction being incomplete with respect to the consumption of the polyepoxide.

5. The composition of claim 1 wherein at the termination of the reaction, at least about 150% of the equivalents of epoxy groups based on the equivalents of the hydroxyl groups initially present in the polyoxyalkylene polyol will have reacted with a member selected from the group consisting of the polyoxyalkylene polyol and a reaction product of the polyoxyalkylene polyol and the polyepoxide.

6. The composition of claim 1 wherein at the termination of the reaction, from about 175% to about 250% of the equivalents of epoxy groups based on the equivalents of the hydroxyl groups initially present in the polyoxyalkylene polyol will have reacted with a member selected from the group consisting of the polyoxyalkylene polyol and a reaction product of the polyoxyalkylene polyol and the polyepoxide.

7. The composition of claim 1 wherein said polyepoxide is a polyglycidyl ether of a polyhydric phenol.

8. The composition of claim 7 wherein said polyglycidyl ether of a polyhydric phenol is a polyglycidyl ether of a bisphenol selected from the group consisting of bisphenol A and bisphenol F.

9. The composition of claim 7 wherein said polyglycidyl ether of a polyhydric phenol is a polyglycidyl ether of bisphenol A.

10. The composition of claim 1 wherein said polyhydric phenol is selected from the group consisting of bisphenol A and bisphenol F.

11. The composition of claim 1 wherein said polyhydric phenol is bisphenol A.

12. The composition of claim 1 wherein the amount of said polyol-epoxy adduct is from about 1% to about 25% of the total weight of said polyol-epoxy adduct, said epoxy resin and said polyhydric phenol.

13. The composition of claim 1 wherein the amount of said polyol-epoxy adduct is from about 5% to about 15% of the total weight of said polyol-epoxy adduct, said epoxy resin and said polyhydric phenol.

14. The composition as claimed in claim 1 wherein the amount of said polyhydric phenol per reactive equivalent of said epoxy resin is from about 0.4 to 0.6.

15. A self-dispersing curable epoxy resin composition comprising the addition product of reactants comprising (a) an epoxy resin selected from the group consisting of diglycidyl ethers of bisphenol A having an epoxide equivalent weight of from about 100 grams/equivalent to about 350 grams/equivalent, (b) from about 0.4 to 0.6 reactive equivalents of bisphenol A per reactive equivalent of said epoxy resin, and (c) from about 5% to about 15% by weight, based on the weight of all reactants, of a polyol-epoxy adduct, said polyol-epoxy adduct comprising the addition product of reactants comprising a polyepoxide with a polyoxyalkylene polyol, wherein the equivalent ratio of epoxide groups of said polyepoxide to hydroxyl groups of said polyoxyalkylene polyol in the reaction mixture is greater than 10:1.

16. An aqueous dispersion comprising a composition as claimed in claim 1.

17. The aqueous dispersion of claim 16 wherein said dispersion is further comprised of a monoepoxide diluent selected from the group consisting of water-immiscible $C_8-C_{20}$ aliphatic monoepoxides.

18. The aqueous dispersion of claim 17 wherein the amount of the mono-epoxide diluent in said aqueous dispersion is from about 0.1% to about 10% by weight of said self-dispersing resin.

19. The aqueous dispersion of claim 17 wherein the amount of the mono-epoxide diluent in said aqueous dispersion is from about 1.0% to about 3.0% by weight of said self-dispersing resin.

20. The aqueous dispersion of claim 17 wherein the mono-epoxide diluent is a glycidyl ether of monohydric $C_8-C_{10}$ aliphatic alcohols.

21. The aqueous dispersion of claim 16 wherein said composition is further comprised of a multi-functional-epoxide.

22. The aqueous dispersion of claim 21 wherein said multi-functional-epoxide is an epoxide having an epoxy functionality of greater than about 2.5.

23. The aqueous dispersion of claim 21 wherein said multi-functional-epoxide is an epoxide having an epoxy functionality greater than about 3.0 to about 4.5.

24. The aqueous dispersion of claim 21 wherein the amount of the multi-functional-epoxide is from about 1% to about 10% by weight of the self-dispersing resin.

25. The aqueous dispersion of claim 21 wherein the amount of the multi-functional- epoxide is from about 2% to about 8% by weight of the self-dispersing resin.

26. The aqueous dispersion of claim 21 wherein said multi-functional-epoxide is an epoxy novolac resin.

27. The aqueous dispersion of claim 26 wherein said multi-functional-epoxide is a phenol-formaldehyde epoxy novolac with an epoxy functionality of about 3.6 to about 3.8.

28. The aqueous dispersion of claim 16 wherein said aqueous dispersion comprises (1) between about 20–80 weight percent of a solvent phase comprising between 50 and 100 weight percent water and between 0 and 50 weight percent of a water-soluble organic cosolvent, and (2) between about 80-20 weight percent of said self-dispersing curable epoxy resin.

29. A coating composition comprising an aqueous dispersion as claimed in claim 16 and a curing agent for said self-dispersing resin.

30. A method of coating a substrate comprising applying thereto a coating composition as claimed in claim 29.

31. A method of preparing a self-dispersing epoxy resin composition comprising reacting a polyepoxide with a polyoxyalkylene polyol wherein the equivalent ratio of epoxide groups of said polyepoxide to hydroxyl groups of said polyoxyalkylene polyol in the reaction mixture is greater than 10:1, to form an polyol-epoxy adduct and reacting said polyol-epoxy adduct with an epoxy resin and a polyhydric phenol to form a self-dispersing epoxy resin.

32. A method of preparing an aqueous dispersion comprising preparing a dispersion in a solvent phase, said solvent phase comprising between 50 and 100 weight percent water and between 0 and 50 weight percent of a water-soluble organic cosolvent, and from about 80-20 weight percent by weight of the dispersion of a self-dispersing curable epoxy resin as claimed in claim 1.

* * * * *